United States Patent
Koyama

(10) Patent No.: US 8,138,979 B2
(45) Date of Patent: Mar. 20, 2012

(54) PORTABLE WIRELESS APPARATUS

(75) Inventor: Tadashi Koyama, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 365 days.

(21) Appl. No.: 12/279,758

(22) PCT Filed: Feb. 22, 2007

(86) PCT No.: PCT/JP2007/053319
§ 371 (c)(1),
(2), (4) Date: Aug. 18, 2008

(87) PCT Pub. No.: WO2007/099859
PCT Pub. Date: Sep. 7, 2007

(65) Prior Publication Data
US 2010/0231458 A1  Sep. 16, 2010

(30) Foreign Application Priority Data

Feb. 24, 2006 (JP) .................. 2006-049061

(51) Int. Cl.
*H01Q 1/24* (2006.01)
*H01Q 1/52* (2006.01)

(52) U.S. Cl. ........................ 343/702; 343/841

(58) Field of Classification Search .......... 343/702, 343/700 MS, 725, 893, 841; 439/668
See application file for complete search history.

(56) References Cited

U.S. PATENT DOCUMENTS

| | | | |
|---|---|---|---|
| 3,573,628 A * | 4/1971 | Cramer et al. | 343/702 |
| 5,517,676 A * | 5/1996 | Sekine et al. | 455/575.5 |
| 6,055,422 A | 4/2000 | Saitoh | |
| 6,224,409 B1 * | 5/2001 | Chang | 439/188 |
| 6,932,626 B2 * | 8/2005 | Costello et al. | 439/108 |
| 7,053,837 B2 * | 5/2006 | Il et al. | 343/700 MS |
| 7,068,229 B2 * | 6/2006 | Lin | 343/702 |
| 2001/0011963 A1 * | 8/2001 | Waters | 343/767 |
| 2004/0119654 A1 | 6/2004 | Koyama | 343/846 |
| 2006/0017625 A1 * | 1/2006 | Tanaka et al. | 343/702 |
| 2007/0188391 A1 * | 8/2007 | Tu et al. | 343/702 |

FOREIGN PATENT DOCUMENTS

| | | |
|---|---|---|
| EP | 1 398 847 A1 | 3/2004 |
| GB | 2312596 A | 10/1997 |
| JP | 9-83229 | 3/1997 |
| JP | 9-289483 | 11/1997 |
| JP | 9-331282 | 12/1997 |
| JP | 11-298231 | 10/1999 |
| JP | 2000216716 A | 8/2000 |
| JP | 2000286767 A | 10/2000 |
| JP | 2000-307339 | 11/2000 |
| JP | 2002-171109 | 6/2002 |
| JP | 2003046407 A | 2/2003 |
| JP | 2003-008320 | 10/2003 |
| JP | 2004-159288 | 6/2004 |
| JP | 2004-364149 | 12/2004 |
| JP | 2005151194 A | 6/2005 |
| JP | 2006-33355 | 2/2006 |

* cited by examiner

Primary Examiner — Jacob Y Choi
Assistant Examiner — Robert Karacsony
(74) Attorney, Agent, or Firm — DLA Piper LLP (US)

(57) ABSTRACT

A diversity type portable wireless apparatus 100 includes two antennas 31 and 32, the two antennas 31 and 32 are arranged at one end within a housing 1; at least one antenna 32 is mounted on a circuit board 5 provided with the housing 1; and a component, for example, a shield case 6 is arranged in the vicinity of one antenna 32, while the component contains a metal portion electrically connected to a reference potential portion formed on the circuit board 5.

5 Claims, 5 Drawing Sheets

PORTABLE WIRELESS APPARATUS

CROSS-REFERENCE TO THE RELATED APPLICATIONS

This application is a national stage of international application No. PCT/JP2007/053319 filed Feb. 22, 2007, which also claims the benefit of priority under 35 USC 119 to Japanese Patent Application No. 2006-049061 filed Feb. 24, 2006, the entire contents of which are incorporated herein by reference.

TECHNICAL FIELD

The present invention relates to a diversity type portable wireless apparatus provided with two antennas.

BACKGROUND ART

Among portable wireless apparatuses such as wireless telephones, portable wireless apparatuses to which diversity techniques are applied have been gradually popularized. That is, while a diversity type portable wireless apparatus is provided with two antennas, as to the same reception signals received by these two antennas, a signal received from one antenna operated under superior electromagnetic wave conditions may be employed with a top priority, or reception signals from two antennas are synthesized with each other by changing weighting.

Also, in portable wireless apparatuses, such portable wireless apparatuses that antennas are built in a housing thereof have been gradually popularized as a major model due to requirements for design aspects. For instance, among folding type portable telephones, such folding type portable telephones that antennas are built in the housing provided with key operation units have been proposed (refer to Patent Document 1.
Patent Document 1: JP-A-2003-8320

DISCLOSURE OF THE INVENTION

Problem to be Solved by the Invention

On the other hand, in diversity type portable wireless apparatuses, if distance between two antennas is closely approached, then interference may occur between these antennas, so that antenna efficiencies may be deteriorated. As a result, two antennas must be sufficiently separated from each other.

However, due to requirements for compact portable wireless apparatuses, there are some cases that two antennas must be necessarily arranged at such a position where these two antennas are located in proximity to each other. In this case, as previously described, there is a problem that these two antennas may interfere with each other, and thus, antenna characteristics are lowered.

The present invention has been made to solve the above-described problem, and there fore, has an object to provide a portable wireless apparatus: that is, in a diversity type portable wireless apparatus in which two antennas are built in a housing thereof, even in such a case that these two antennas are arranged in proximity to each other, antenna interference can be readily suppressed.

Means for Solving the Problem

As a consequence, according to the present invention, there is provided a diversity type portable wireless apparatus comprising: two antennas; a housing; and a circuit board provided inside the housing, a reference potential portion being formed on the circuit board; wherein: the two antennas are arranged at one end within the housing; at least one antenna of the two antennas is mounted on the circuit board; and a component having a metal portion electrically connected to the reference potential portion is arranged in the vicinity of the one antenna.

Preferably, the above-described one antenna is a receiving antenna.

Preferably, the above-described component having the metal portion is a shield case which is arranged on the circuit board such that the shield case covers an electronic component mounted on the circuit board, or the component having the metal portion is an earphone jack mounted on the circuit board, or the component having the metal portion is a card connector mounted on the circuit board.

Advantage of the Invention

In accordance with the portable wireless apparatus of the present invention, in the two diversity type antennas arranged inside the housing which constitutes this portable wireless apparatus, the component containing the metal portion electrically connected to the reference potential portion of the circuit board provided in the housing is arranged in the vicinity of one antenna so as to deteriorate an antenna gain of one antenna. As a result, a deterioration as to an antenna gain of the other antenna is reduced, so that it is possible to avoid such an event that these two antennas may interfere with each other, so that the antenna gains thereof are deteriorated.

As a consequence, even when the two antennas are arranged on one side of the housing, the diversity receiving operation can be carried out under better condition by these antennas. Also, a freedom of arranging these antennas can be increased, and accordingly, a design freedom of portable wireless apparatuses can be enlarged, so that portable telephone apparatuses can be made compact and slim.

BRIEF DESCRIPTION OF THE DRAWINGS

FIG. 4(*b*) is a sectional view for showing an assembling condition of a tip portion of the first housing employed in the portable telephone according to the exemplary embodiment of the present invention.

REFERENCE NUMERALS

Figure 1:
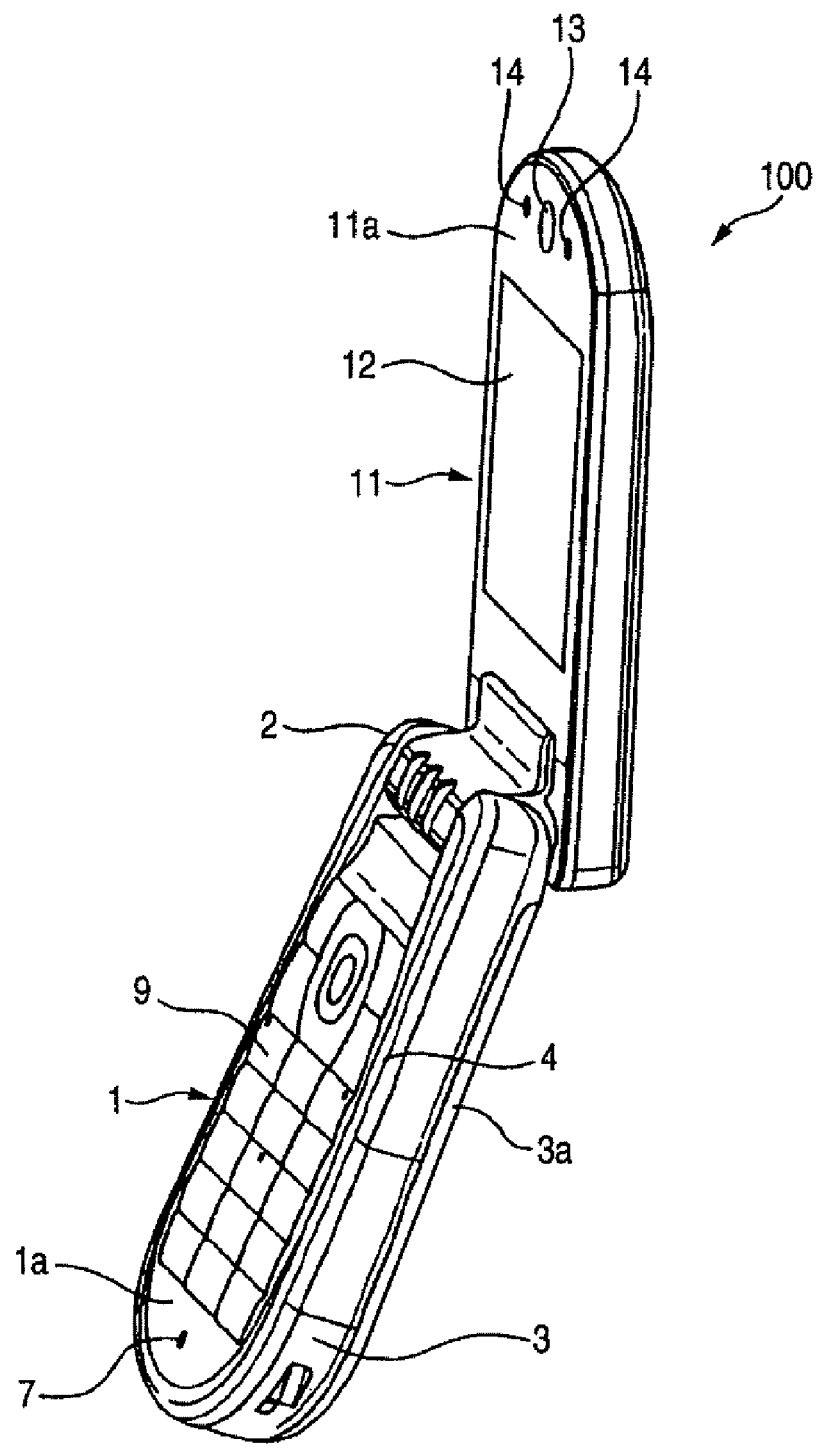
FIG. 1 is an outer appearance perspective view for showing an entire structure of a portable telephone according to an exemplary embodiment of the present invention.

1 first housing
5 circuit board 5a front plane
5b rear plane
6 shield case
31 transmitting/receiving antenna
32 receiving antenna

PREFERRED EMBODIMENTS FOR CARRYING OUT THE INVENTION

Hereinafter, an exemplary embodiment of the present invention will be described with reference to the drawings.

FIG. 1 is an outer appearance perspective view for showing an entire structure of a portable telephone 100 according to the exemplary embodiment of the present invention.

This portable telephone 100 corresponds to a CDMA (Code Division Multiple Access) 2000 1x and CDMA 2000 1x EVDO (Evolution Data Only) type telephone, and has a first housing 1 and a second housing 11. The first housing 1 is provided with a key operation unit 9 for accepting operations made by a user, and the like. The second housing 11 is provided with a main display 12, and the like. The first housing 1 is coupled to the second housing 11 via a hinge portion 2 formed on each one end of these first and second housings 1 and 11 in such a manner that the first housing 1 and the second housing 11 can be folded to be located opposite to each other.

The first housing 1 has a first case member 3 and a second case member 4. In the first housing 1, a key operation unit 9 having a telephone communication starting key, a telephone communication ending key, and the like are provided with being exposed on an opposite plane 1a located opposite to the second housing 11 under closed condition; and a microphone 7 is arranged at a lower portion of the key operation unit 9. A portion of an outer plane of the first housing 1 is formed by a lid member 3a, and a secondary battery 8 (refer to FIG. 3) is housed inside the lid member 3a.

In the second housing 11, a main display 12 constructed of a liquid crystal display, an organic EL display, an inorganic EL display, or the like is arranged with being exposed on an opposite plane 11a which is located opposite to the first housing 1 under closed condition; and a speaker 13 is arranged above the main display 12.

Also, while cushion materials 14 are mounted at right and left portions of the speaker 13 under such a condition the cushion materials 14 are projected from the right and left portions, it is possible to avoid by the cushion materials 14 that when the first housing 1 and the second housing 2 are closed, the first housing 1 is directly contacted to the second housing 11.

Figure 2:
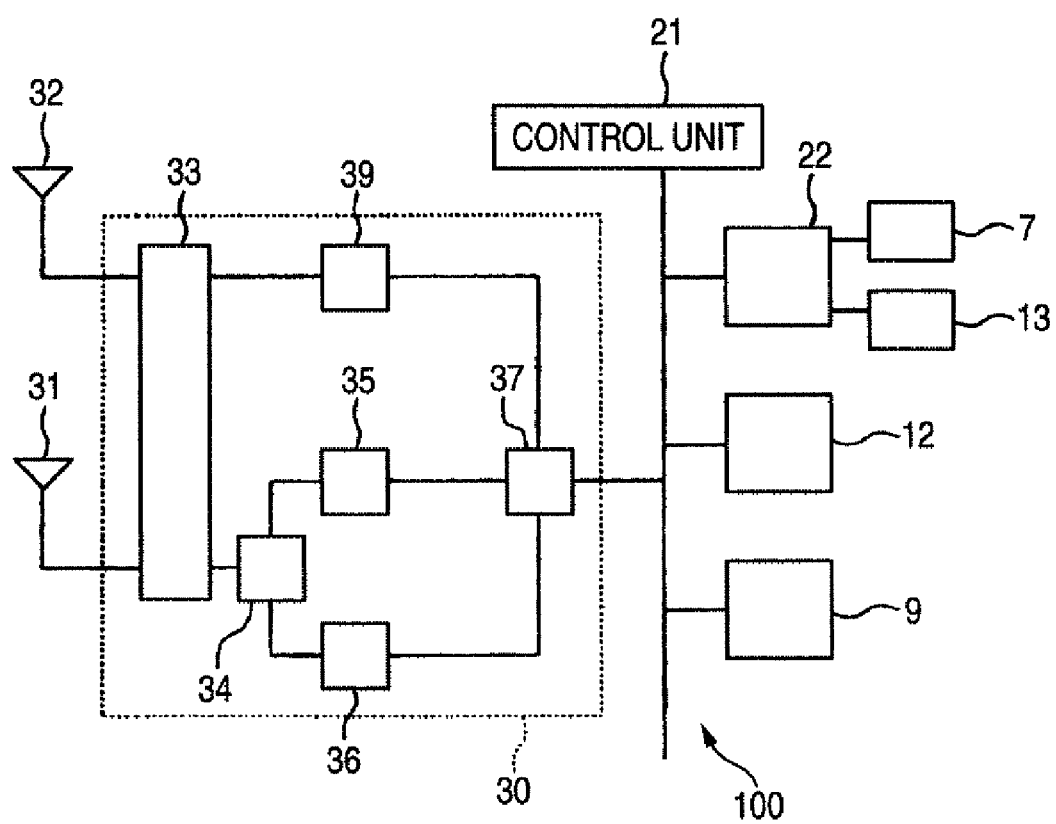
FIG. 2 is a block diagram for showing an arrangement of the portable telephone shown in FIG. 1.

FIG. 2 is a block diagram for showing an arrangement of the portable telephone 100 shown in FIG. 1.

The portable telephone 100 is provided with a control unit 21 such a CPU, the key operation unit 9, the main display 12, a voice processing unit 22, a wireless communication unit 30, and the like. The control unit 21 controls the portable telephone 100 in a unification manner. The voice processing unit 22 is connected to both the microphone 7 and the speaker 13 so as to process voice signals.

The wireless communication unit 30 performs a diversity receiving operation, and is provide with a transmitting/receiving antenna 31, and a receiving antenna 32. The transmitting/receiving antenna 31 is connected to a communication processing unit 37 via a high frequency switch 33, an antenna common device 34, a first receiving circuit 35, and a transmitting circuit 36. The receiving antenna 32 is connected via the high frequency switch 33 and a second receiving circuit 39 to the communication processing unit 37.

With employment of the above-described arrangement, when the antenna 31 and 32 receive wireless electromagnetic waves transmitted from a base station (not shown) based upon the CDMA 2000 1x EVDO system, the communication processing unit 37 synthesizes wireless signals with each other, which are entered from both the antennas 31 and 32 to the first receiving circuit 35 and the second receiving circuit 39, and then, processes the synthesized wireless signal.

Also, the communication processing unit 37 transmits a wireless signal to the base station via the transmitting circuit 36, the antenna common device 34, the high frequency switch 33, and the transmitting/receiving antenna 31.

Figure 3:
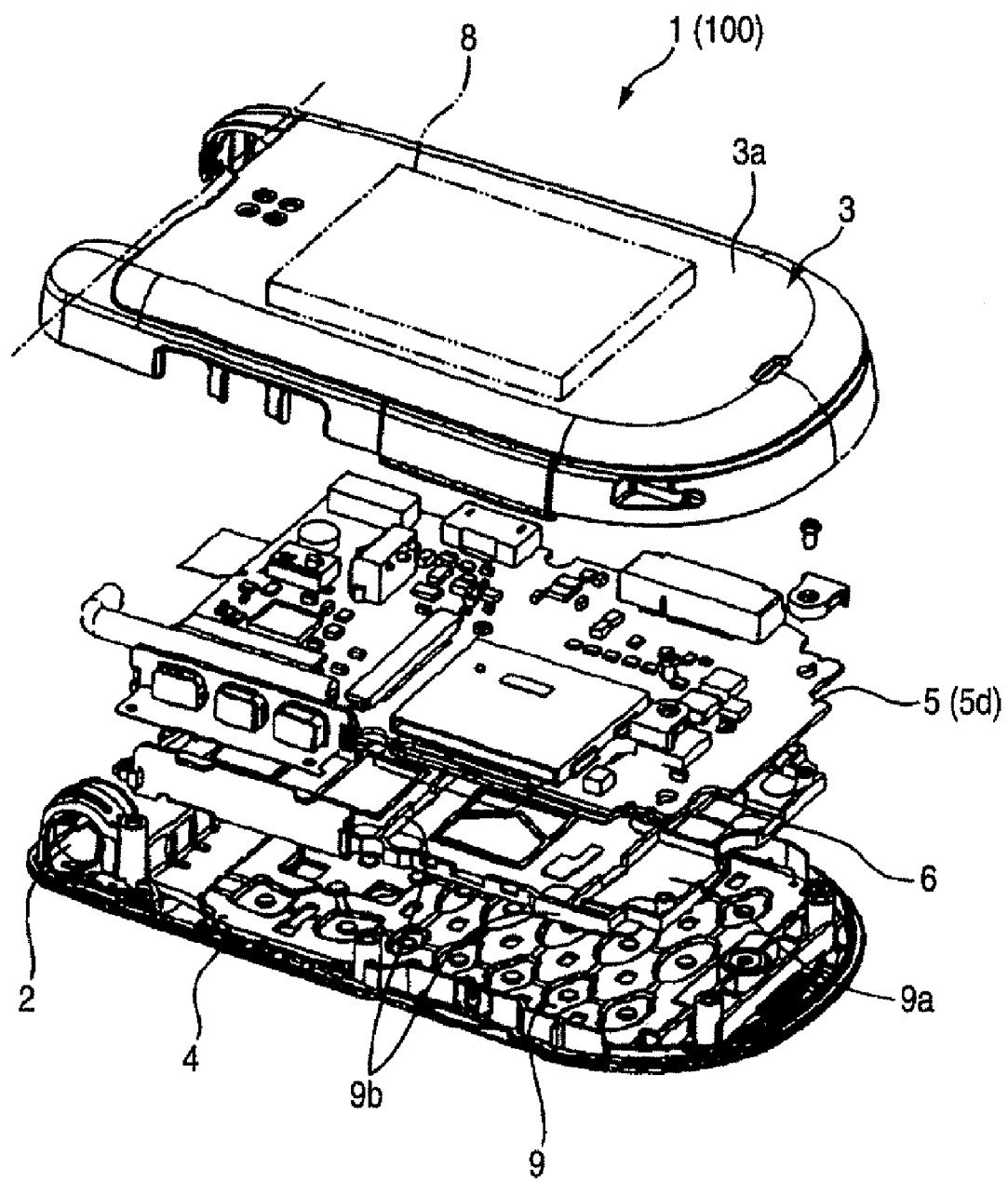
FIG. 3 is an exploded perspective view for showing a structure of a first housing in the portable telephone according to the exemplary embodiment of the present invention.

FIG. 3 is an exploded perspective view for showing a detailed structure of the first housing 1 of the portable telephone 100 shown in FIG. 1.

Inside the first housing 1, a circuit board 5, a shield case (component containing metal portion) 6, and the key operation unit 9 are provided. It should also be noted that reference numeral 8 indicates a secondary battery which is stored in a space formed between the first case member 3 and the lid member 3a.

Electronic components such as an integrated circuit, resistors, and capacitors are mounted on the circuit board 5; and a connection wiring pattern for connecting these electronic components to each other, and a reference potential pattern (ground pattern) are formed on the circuit board 5. In addition, the receiving antenna 32 is mounted on the circuit board 5 (refer to FIG. 4(b) and FIG. 5).

The shield case 6 is a box-shaped member having an electric conductive characteristic, which is constituted by a top plate 9a made of a metal, and a plurality of wall portion 9b. The metal top plate 9a has a flat plate shape having a size which covers a front plane 5a (namely, plane on the side of key operation unit 9) of the circuit board 5. The plurality of wall portions 9b are manufactured by resins on which conducting films are covered, and are provided in such a manner that these wall portions 9b are vertically projected from the top plate 9a. The shield case 6 is arranged in such a manner that the shield case 6 is arranged on the opposite side of the secondary battery 8 by sandwiching the circuit board 5 so as to cover the front plane 5a (namely, plane on the side of key operation unit 9) of the circuit board 5.

The shield case 6 is screwed at a plurality of portions thereof with respect to the circuit board 5, and also, is electrically connected to the reference potential portion (ground portion) of the circuit board 5. As a result, the shield case 6 may avoid that the electronic components mounted on the front plane 5a of the circuit board 5 are influenced by interference caused by electromagnetic waves and the like. Then, the circuit board 5, the shield case 6 mounted and fixed on this circuit board 5, and the key operation unit 9 provided on the top plate 9a of the shield case 6 are arranged in such a space which is formed by the first case member 3 and the second case member 4. The first case member 3 is joined to the second case member 4 under opposing condition.

It should be noted that the above-explained exemplary embodiment has exemplified the following structure: That is, the top plate 9a for constructing the shield case 6 is made of the metal, and the wall portions 9b are made of the resin covered by the electric conducting film. There is no problem if the entire structure of the top plate 9a and the wall portions 9b has the electric conductive characteristic. Alternatively, for instance, the entire structure of the shield case 6 may be made of a metal. Otherwise, both the top plate 9a and the wall portion 9b may be formed in an integral manner by employing a resin, and thereafter, the entire construction may be covered by the electric conducting film. More specifically, since the entire structure of the shield case 6 is manufactured by employing the resin covered by the electric conducting film, the weight of the entire structure thereof may be suppressed, so that the portable telephone 100 may be made in the light weight.

Figure 4:
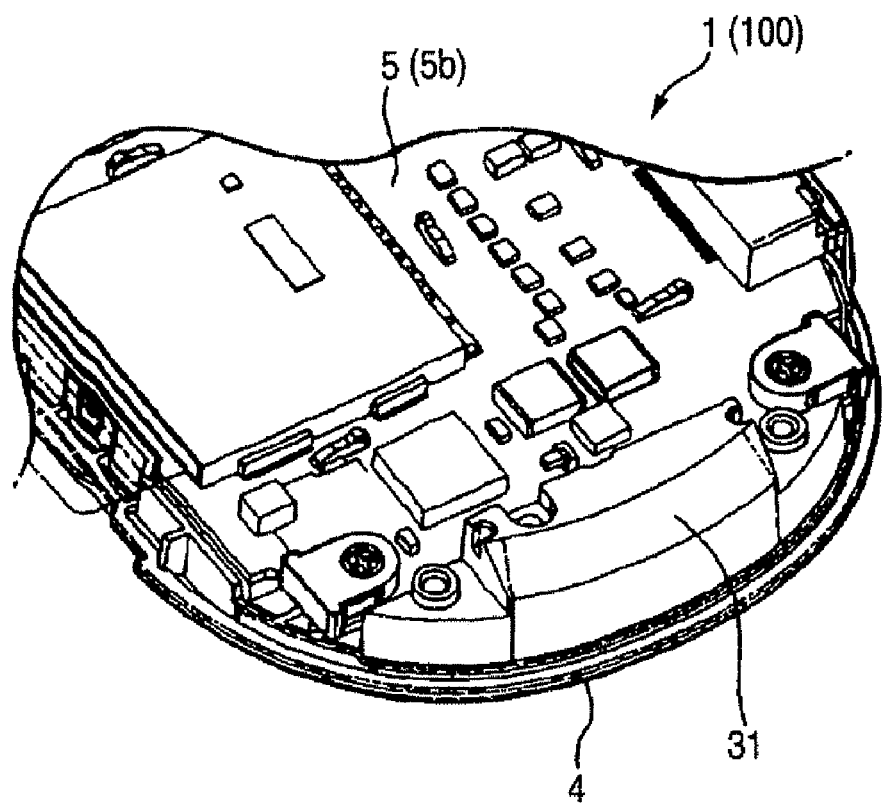
FIG. 4(*a*) is a perspective view for showing an assembling condition of a tip portion of a first housing employed in the portable telephone according to the exemplary embodiment of the present invention.
Figure 4:
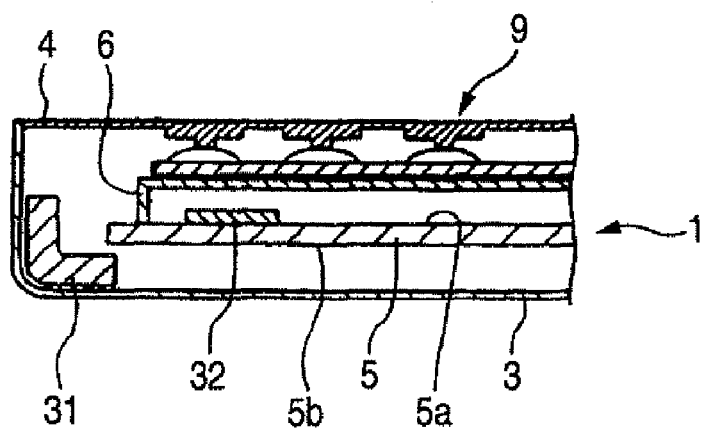

Also, as shown in a perspective view of FIG. 4(*a*) for showing an assembling condition of a tip portion (one end portion) of the first housing 1, and as represented in a sectional view of FIG. 4(*b*) for showing the tip portion (one end portion) of the first housing 1, the circuit board 5 is arranged up to the internal tip portion (one end portion) of the first housing 1. Also, the transmitting/receiving antenna 31 is arranged in a space between the circuit board 5 and an edge portion inside the first housing 1.

The receiving antenna 32 mounted on the circuit board 5 is arranged in proximity to the transmitting/receiving antenna 31 employed in the circuit board 5.

Then, as shown in FIG. 4(*b*), the receiving antenna 32 mounted on the circuit board 5 may be covered by the shield case electrically connected to the reference potential portion of the circuit board 5. In other words, it is so constructed that the shield case 6 electrically connected to the reference potential portion of the circuit board 5 is arranged in the vicinity of the receiving antenna 32.

That is to say, both the transmitting/receiving antenna 31 and the receiving antenna 32 have antenna gains in the same frequency band, or in the frequency bands located in proximity to each other. If such antennas 31 and 32 are arranged in proximity to each other, then these antennas 31 and 32 are electromagnetically coupled to each other, so that the antenna gains are deteriorated with each other. In other words, such a phenomenon that both the antennas 31 and 32 are electromagnetically coupled to each other may occur. As a result, transmitting electromagnetic waves and receiving electromagnetic waves are distributed from each other, so that the resulting antenna gains are deteriorated, as compared with such an antenna gain that each of these antennas 31 and 32 is independently operated.

Therefore, as shown in FIG. 4(*b*), the shield case 6 electrically connected to the reference potential portion of the circuit board 5 is arranged in the vicinity of the reception antenna 32. As a consequence, although the antenna gain of the receiving antenna 32 is deteriorated, the deterioration of the antenna gain as to the transmitting/receiving antenna 31 can be reduced. In other words, since the antenna gain of the receiving antenna 32 is previously deteriorated, the interference between the receiving antenna 32 and the transmitting/receiving antenna 31 can be suppressed, and thus, the deterioration of the antenna gain of the transmitting/receiving antenna 31 can be reduced. As a result, it is possible to avoid that the gains of both the antennas 31 and 32 are deteriorated.

Therefore, the portable telephone 100 can perform the diversity reception by employing two sets of these antennas 31 and 32 under better condition. Also, these two antennas 31 and 32 can be arranged in the vicinity of each other within the single housing 1, so that the portable telephone 100 can be made compact and slim.

More specifically, the receiving antenna 32 is such an antenna which is exclusively utilized for a receiving operation, and is not used in order to perform such a transmitting operation executed in the transmitting/receiving antenna 31. As a result, such a high antenna gain obtained in the transmitting/receiving antenna 31 is no longer required in order to achieve a diversity effect. Therefore, it is preferable that the shield case 6 is set in proximity to the receiving antenna 32.

However, if the shield case 6 is disposed excessively close to the receiving antenna 32, then radiation therefrom may be interrupted, or the receiving antenna 32 may not function as antenna due to coupling effect with the reference potential portion. It is preferable that the receiving antenna 32 is disposed properly close to the shield case 6 within such a range that a minimum antenna gain capable of achieving the diversity effect can be obtained.

Figure 5:
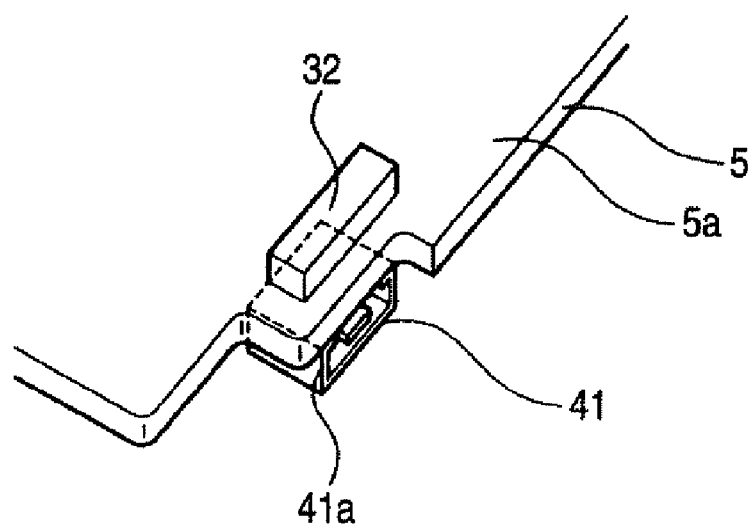
FIG. 5 is a perspective view for showing an example in which an earphone jack is approached to a receiving antenna instead of a shield case.
Figure 6:
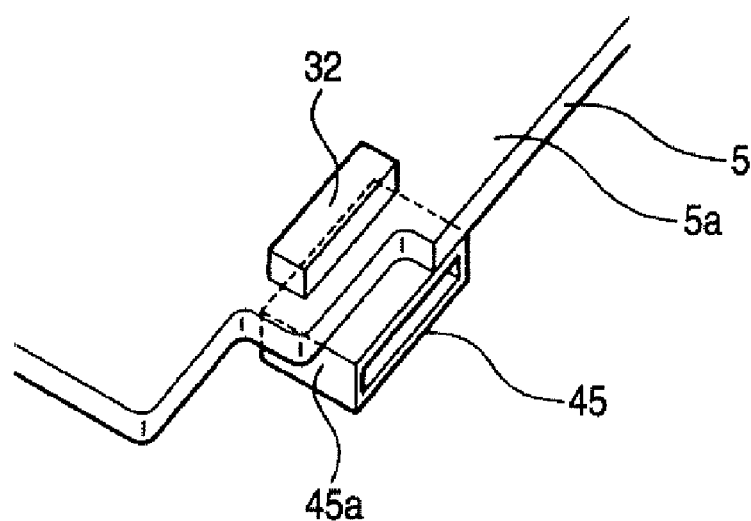
FIG. 6 is a perspective view for showing an example in which a card connector is approached to the receiving antenna instead of the shield case.

FIG. 5 is a perspective view for showing an example in which an earphone jack is disposed at a position close to a receiving antenna instead of a shield case. FIG. 6 is a perspective view for showing an example in which a card connector is disposed at a position close to the receiving antenna instead of the shield case.

FIG. 5 and FIG. 6 are such diagrams that either an earphone jack 41 or a card connector 45 is mounted and arranged at a position which is located opposite to the receiving antenna 32 and located on a rear plane 5*b* opposite to the front plane 5*a* where the receiving antenna 32 is mounted. That is, either the earphone jack 41 or the card connector 45 is provided with a metal portion 41*a*, or 45*a*, which are connected to the connection wiring pattern and also the reference potential pattern. The metal portion 41*a*, or 45*a* electrically connected to the reference potential pattern can be arranged in the vicinity of the receiving antenna 32. As previously described, even in such a case that either the earphone jack 41 or the card connector 45 is arranged in proximity to the receiving antenna 32, similar to the above-described example of the shield case 6, the antenna gain of the receiving antenna 32 can be lowered. Accordingly, the interference between the receiving antenna 32 and the transmitting/receiving antenna 31 can be suppressed, and thus, the deterioration of the antenna gain of the transmitting/receiving antenna 31 can be reduced. As a result, it is possible to avoid that the gains of both the antennas 31 and 32 are deteriorated.

In this case, in order that lowering of the antenna gain of the reception antenna 32 does not excessively become large, it is preferable that a portion located within the shield case 6, on which the receiving antenna 32 is provided, is cut off, or is made of an electric non-conductive characteristic.

It should be understood that the various shapes of the structural members and combinations thereof represented in the above-described exemplary embodiment are merely one exemplification, and therefore, may be modified in various manners based upon design requirements and the like within a range which is not deviated from the gist of the present invention.

For example, the above-described exemplary embodiment is exemplified such a case that the shield case 6, the earphone jack 41, the card connector 45, and the like are employed as the components containing the metal portions which are arranged in the vicinity of the receiving antenna 32. However, the present invention is not limited only to these components, but the present invention may be applied to such components containing metal portions electrically connected to the reference potential portion of the circuit board, for example, a screw, a recharging terminal, a button type cell of a clock back-up circuit, and the like. Also, degrees for lowering the antenna gain in the receiving antenna 32 may be defined based upon a dimension of a metal portion and a distance of this metal portion measured from the receiving antenna 32, and furthermore, a deterioration degree of the antenna gain of the receiving antenna 32 may be defined based upon a distance between the transmitting/receiving antenna 31 and the receiving antenna 32. As a consequence, the dimension and the distance of the metal portion from the receiving antenna 32, and the distance between these two antennas 31 and 32 may be properly set within such a range that the minimum antenna gain may be obtained by which the diversity effect may be achieved.

Also, as the diversity reception system, the above exemplary embodiment is described the CDMA2000 1x EVDO system in which the S/N ratios of the reception signals of the two antennas are compared with each other so as to optimize weighting of the respective reception signals in the communication processing unit 37 for the diversity reception. Alternatively, for example, the present invention may be applied to the W-CDMA. HSDPA (High Speed Data Packet Access) system, and the like.

Also, as a housing in which the two antennas 31 and 32 are built, not only the first housing 1, but also the second housing 11 may be employed.

Moreover, the above-described housing may be applied not only to a tip portion of the housing, but also a side edge portion of the housing. In any of these alternative cases, in such a case that while these two antennas 31 and 32 are located in proximity to each other, interference may occur between these two antennas 31 and 32, the present invention may be applied to any one of these cases.

Moreover, although the portable telephone 100 is described in the above-explained exemplary embodiment, the present invention is not limited only to this portable telephone 100. If portable electronic appliances are provided with wireless units capable of performing diversity receiving operations, then the present invention may be alternatively applied to, for example, PDAs (Personal Digital Assistants), and the like.

The present patent application has been filed on the basis of claiming Japanese Patent Application (JP-A-2006-049061) filed on Feb. 24, 2006, the contents of which have been incorporated herewith as references.

The invention claimed is:

1. A diversity type portable wireless apparatus comprising:
two antennas;
a wireless communication unit;
a housing; and
a circuit board provided inside the housing, a reference potential portion being formed on the circuit board; wherein:
the two antennas are arranged at one end within the housing;
at least one antenna of the two antennas is mounted on the circuit board;
the at least one antenna of the two antennas is a receiving antenna;
the other antenna of the two antennas is a transmitting and receiving antenna;
the wireless communication unit is configured to perform a diversity receiving operation using the at least one antenna and the other antenna; and
a component having a metal portion electrically connected to the reference potential portion is arranged in the vicinity of the at least one antenna such that a gain of the at least one antenna is lowered and deterioration of a gain of the other antenna is reduced, thereby suppressing an interference between the at least one antenna and the other antenna.

2. The portable wireless apparatus as claimed in claim 1, wherein:
the component having the metal portion is a shield case which is arranged on the circuit board such that the shield case covers an electronic component mounted on the circuit board.

3. The portable wireless apparatus as claimed in claim 1, wherein:
the component having the metal portion is an earphone jack mounted on the circuit board.

4. The portable wireless apparatus as claimed in claim 1, wherein:
the component having the metal portion is a card connector mounted on the circuit board.

5. A diversity type portable wireless apparatus comprising:
two antennas;
a wireless communication unit;
a housing; and
a circuit board provided inside the housing, a reference potential portion being formed on the circuit board; wherein:
the two antennas are arranged at one end within the housing;
at least one antenna of the two antennas is mounted on the circuit board;
the at least one antenna of the two antennas is a receiving antenna;
the other antenna of the two antennas is a transmitting and receiving antenna;
the wireless communication unit is configured to perform a diversity receiving operation using the at least one antenna and the other antenna; and
a component having a metal portion electrically connected to the reference potential portion is arranged in the vicinity of the at least one antenna;
wherein the component having the metal portion is a shield case which is arranged on the circuit board such that the shield case covers an electronic component mounted on the circuit board and the at least one antenna and such that a gain of the at least one antenna is lowered and deterioration of a gain of the other antenna is reduced, thereby suppressing an interference between the at least one antenna and the other antenna.

* * * * *